P. McKINLAY.
Rice Cleaner.
No. 482. Reissued Aug. 11, 1857.
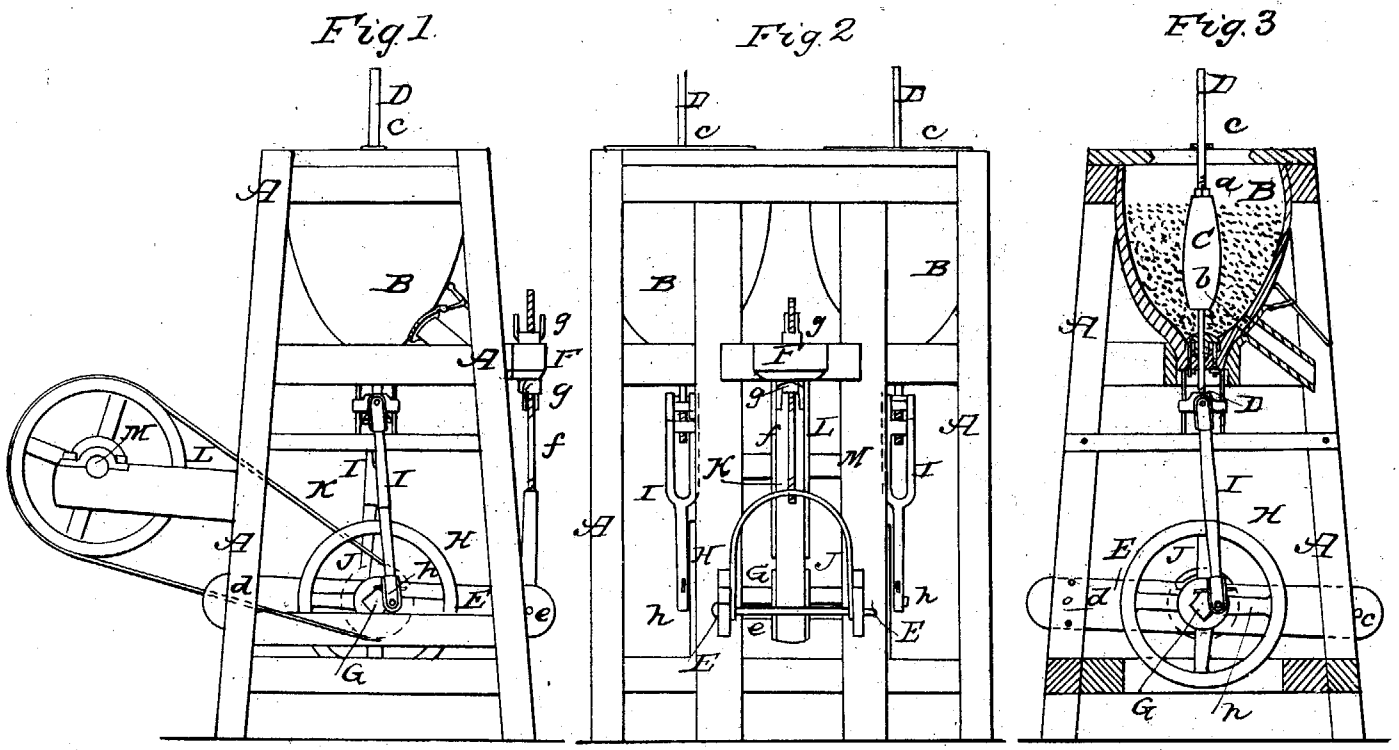
N. PETERS. Photo-Lithographer, Washington, D. C.

UNITED STATES PATENT OFFICE.

PETER McKINLAY, OF CHARLESTON, SOUTH CAROLINA.

IMPROVEMENT IN RICE-HULLERS.

Specification forming part of Letters Patent No. 8,010, dated April 1, 1851; Reissue No. 182, dated August 11, 1857.

*To all whom it may concern:*

Be it known that I, PETER McKINLAY, of the city of Charleston, in the District of Charleston and State of South Carolina, have invented a new and useful Improvement in Mills for Cleansing Rice; and I do hereby declare that the following is a full, clear, and exact description of the same, reference being had to the accompanying drawings, forming a part of this specification.

Figure 1 is a side elevation of one of my improved mills having two mortars. Fig. 2 is a front elevation of the same. Fig. 3 is a vertical section taken from back to front through the center of one of the mortars.

Similar letters in the several figures refer to corresponding parts.

The nature of my invention consists in operating the pestle by attaching it to a rod which passes through the bottom of the mortar, and is attached to a connecting-rod which connects it to a crank on a shaft having its bearings in levers so arranged as to allow of the pestle being adjusted at any required height in the mortar.

The object of my invention is to separate the thin skin or film which remains on the grain after the hull, or rough outside shell, has been taken off and blown away, without breaking or bruising, and thereby lessening the market value of the rice.

To enable others skilled in the art to make and use my invention, I will proceed to describe its construction and operation.

A A represent a strong frame of timber, consisting of posts and cross-timbers of sufficient strength to carry the working parts of the mill.

B B are the mortars, which are of the same form as those usually employed. They are supported on a platform in the frame at a suitable height to admit the working parts below them. Each one has an opening at or near the bottom, closed by a draw-gate, for the purpose of letting out the rice after it is cleaned.

C, Fig. 3, is one of the pestles or stampers which is of cast-iron or other suitable metal, and may be either solid or hollow.

D is a rod which passes through the pestle. The pestle is secured to it by a nut, *a*, which fits on a screw on the rod. The screw and nut will admit of the pestle being adjusted to a higher or lower position on the rod, according to the distance above the bottom it is wished to allow the pestle to descend. The lower end of the rod passes through a stuffing-box, *b*, in the bottom of the mortar (see Fig. 3,) which keeps the rice from leaking out; and its upper end works in a guide, *c*, which is placed across the top of the mortar. A cross-head may be applied to the lower end, being bored to fit stationary guide-bars, for the purpose of keeping the pestle in line.

E E are levers, which are secured by pins or fulcra *d d* to the back part of the frame. A pin or bolt, *e*, passes through the opposite ends of these levers, and also through the forked ends of a suspension-rod, *f*, which is screwed at its upper end, and secured by nuts *g g* to a sill or shaft, F, on the front of the frame. One nut being above the sill and the other being below it, by unscrewing or screwing these nuts the forward ends of the levers may be raised or depressed.

G is a shaft carrying fly-wheels H H. It has journals fitting in bearings in the levers E E. Directly under a line drawn through the centers of the mortars, on each of the fly-wheels H H, there is a pin, *h*, which serves as a crank-pin.

I I are connecting-rods provided with bearing-boxes at each end, one end of each being attached to one of the crank pins *h h*, and the other end to the end of one of the rods D D.

J is a pulley, fast on the shaft G. It receives motion through a band, K, from a pulley, L, or the main driving-shaft M, which rests in bearings or brackets at the back of the frame.

The operation of the mill is as follows: The proper quantity of rice being put in the mortars, rotary motion is communicated from the shaft M to the shaft G, which will cause the crank-pins *h h* to give a reciprocating rectilinear motion to the pestles. This motion should be given at the rate of about from one hundred and twenty to one hunderd and fifty strokes per minute. The pestle, in its downward stroke, (not being allowed to descend quite to the bottom of the mortar,) will cause the rice under it to receive considerable pressure, and to be forced from beneath it toward the sides of the mortar, which will create great friction between the grains, and will scrub off the skin, but will not strike or beat it with sufficient force to break the grain. When it is sufficiently cleansed, the draw-gate at the bottom of the mortar may be opened and the rice allowed to run out.

The method of operating the pestles or stamper in most general use is to have it very heavy, and to raise it to a considerable height by means of levers or lifters or a shaft of large diameter placed above the mortar, when it is released and allowed to fall by its own gravity or weight. This requires very heavy machinery and can only be operated at a very slow speed in consequence of the danger of breaking the lifters. It also breaks the grain by the great percussive force with which the pestle strikes or beats it, and is frequently out of repair.

The advantages of my improvements are, that in consequence of the rapid motion of the pestle the rice is cleansed much more quickly and more perfectly; that the rice can be drawn off from the bottom of the mortar instead of being taken out by scoops from the top, which saves considerable time and inconvenience; that the machinery for operating the pestle is lighter, takes less power to drive, and is not so liable to get out of repair; that the pestle can be raised to any height above the bottom of the mortar, so as to give greater or less friction to the rice, as may be required, by raising or lowering the suspension-rods *f*, which will raise or lower the shaft G.

Having described my invention, I will now state what I claim as new in my invention and desire to secure by Letters Patent.

I claim—

Operating the pestle by having it attached to a rod passing through the bottom of the mortar, and receiving motion through a crank or its equivalent, substantially as and for the purpose and object herein set forth.

PETER McKINLAY.

Witnesses:

LEWIS CRUGER,

N. CALLAN.